June 11, 1963 W. E. KNAPP ETAL 3,092,922
LAND LEVELER
Filed June 15, 1961 4 Sheets-Sheet 1
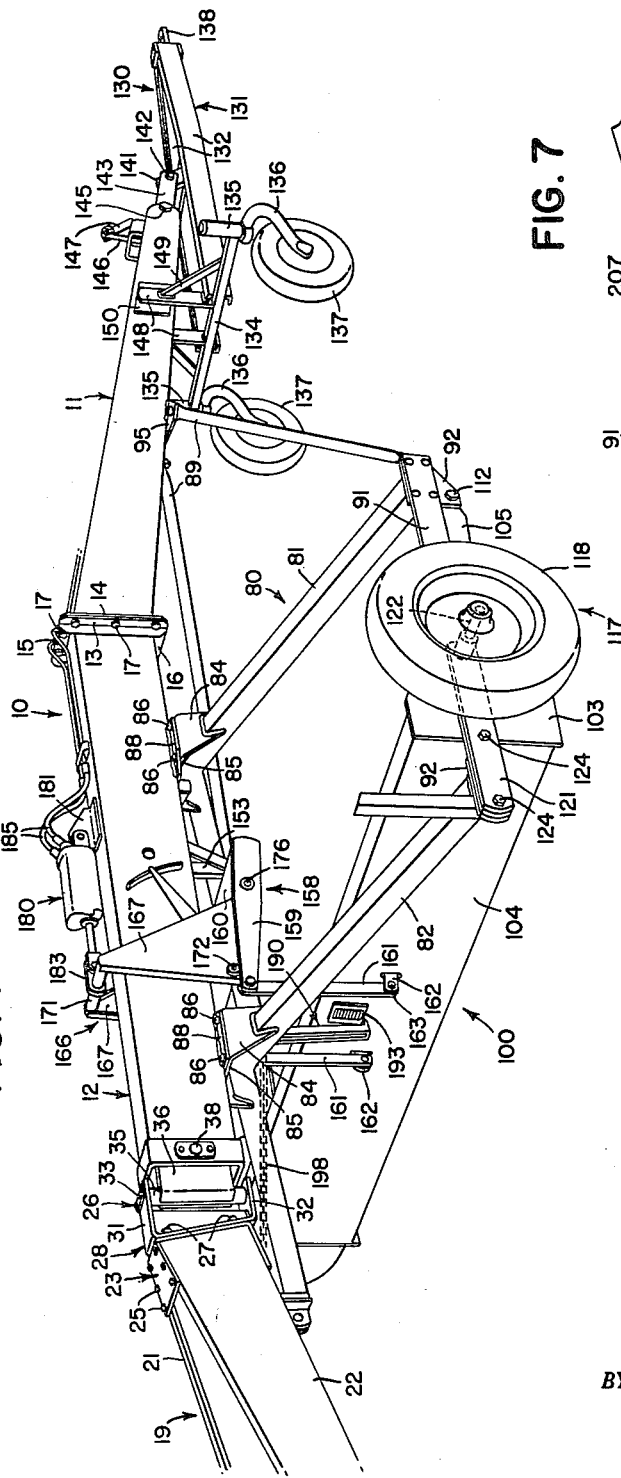
INVENTORS
WILLIAM E. KNAPP
WILLIAM S. TSUCHIYA
DAVID W. CAYTON
BY Roger C. Johnson
ATTORNEY

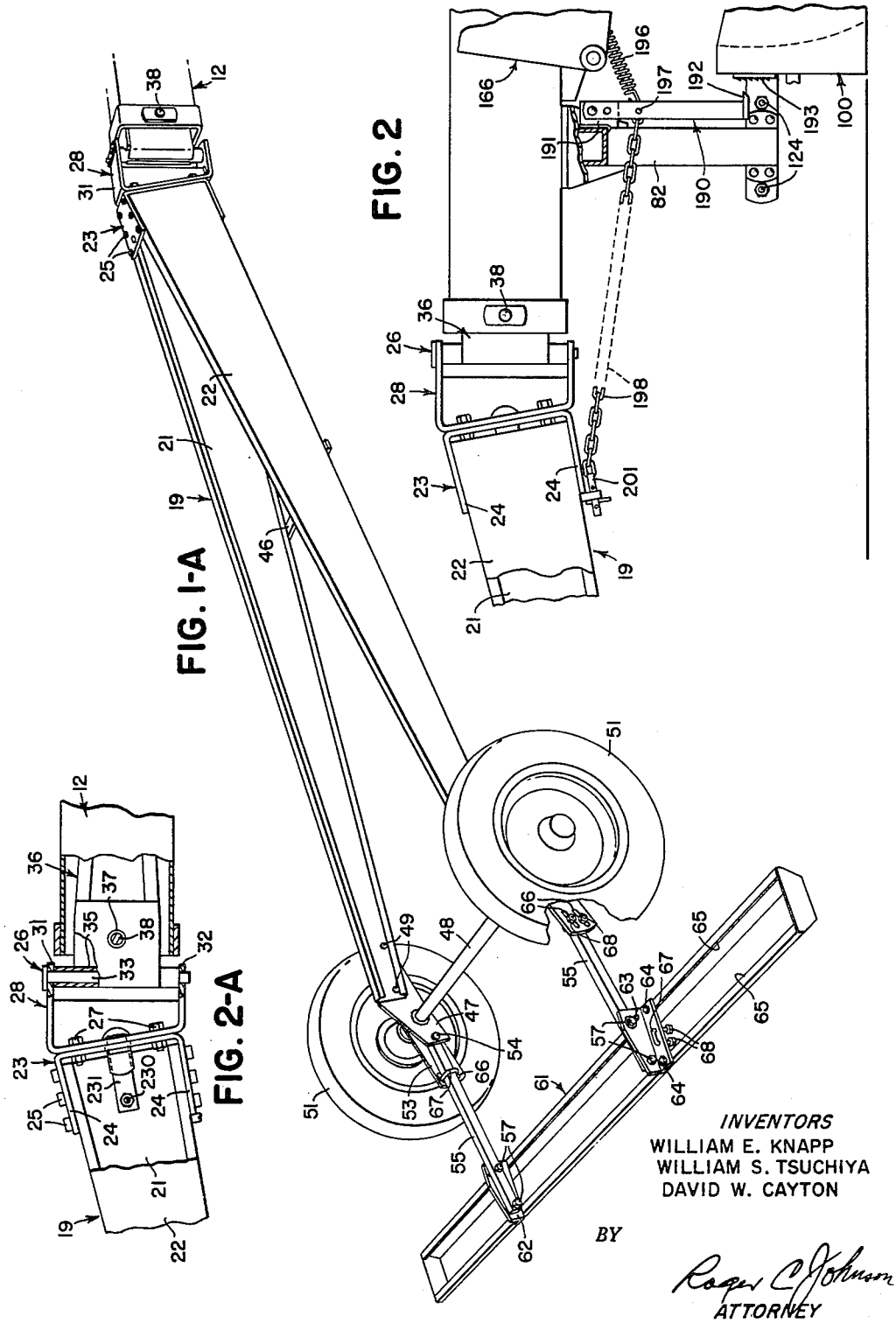

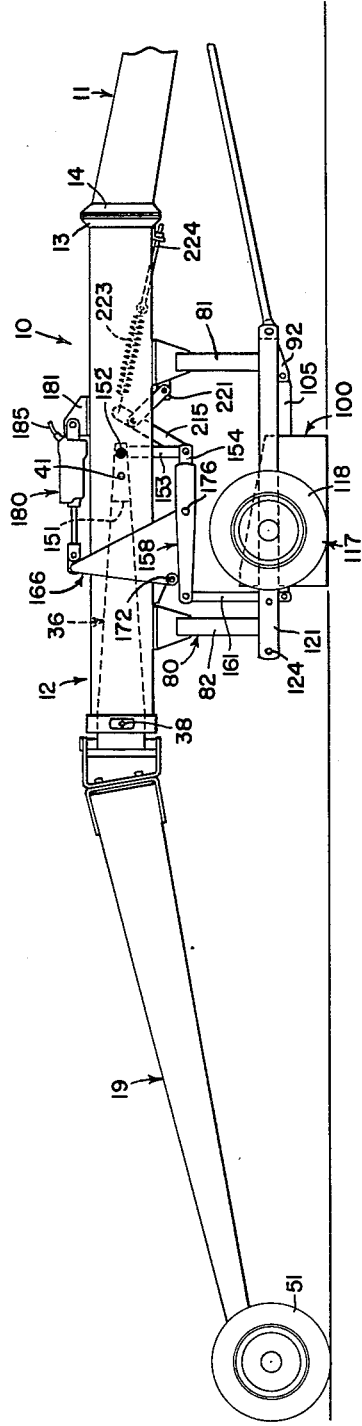
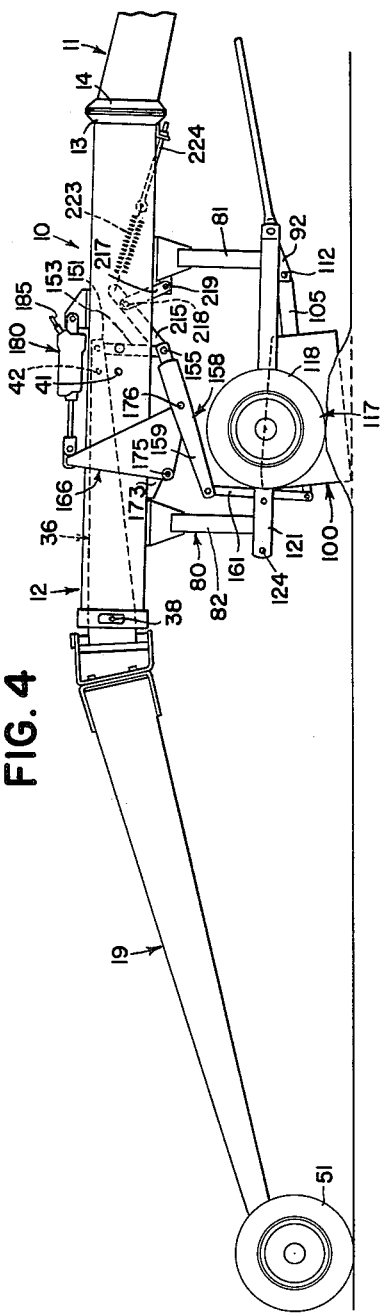

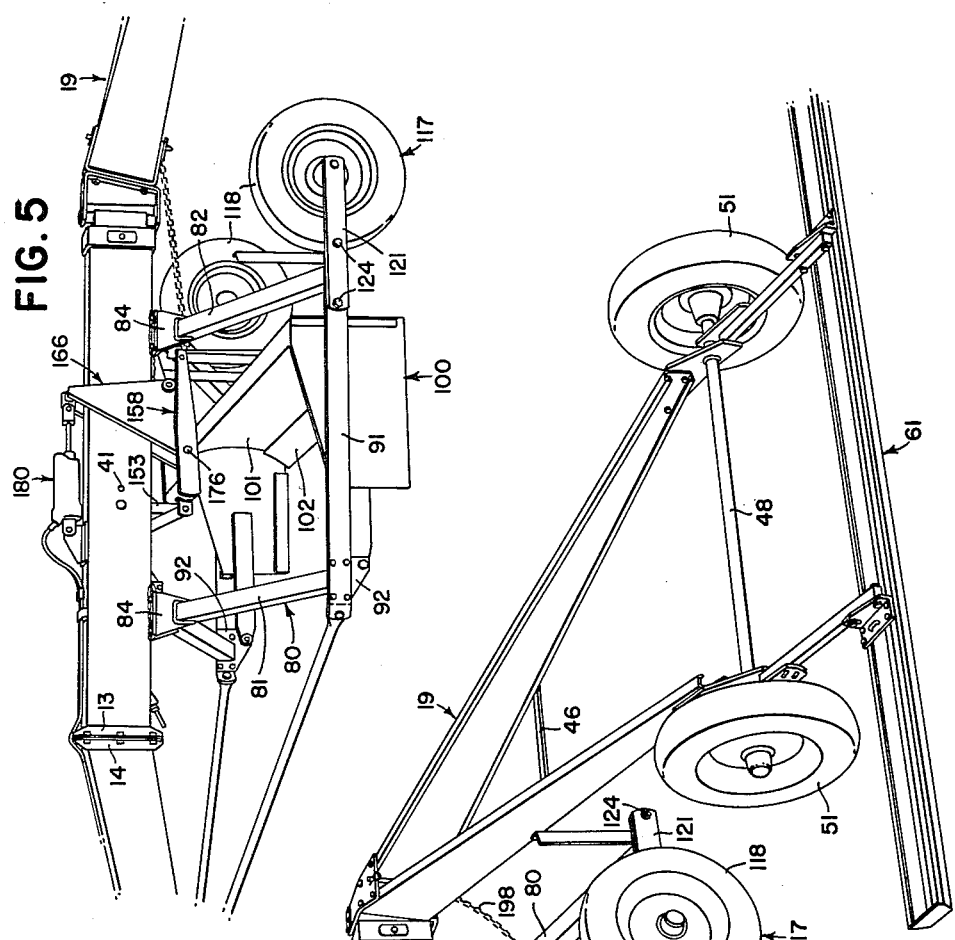
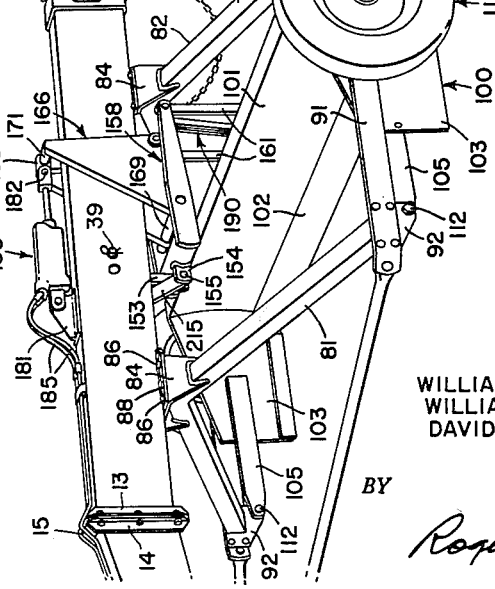
INVENTORS
WILLIAM E. KNAPP
WILLIAM S. TSUCHIYA
DAVID W. CAYTON United States Patent Office 3,092,922
Patented June 11, 1963

3,092,922
LAND LEVELER
William E. Knapp and William S. Tsuchiya, Los Angeles, and David W. Cayton, Whittier, Calif., assignors to Deere & Company, Moline, Ill., a corporation of Delaware
Filed June 15, 1961, Ser. No. 117,469
11 Claims. (Cl. 37—180)

This invention relates generally to agricultural implements and more particularly to wheel supported planes for smoothing and leveling land and other agricultural earth moving.

The object and general nature of this invention is the provision of a new and improved plane or land leveler designed for use in irrigated and other areas where farmers and growers want to level and smooth their land.

More specifically, it is a feature of this invention to provide a land leveler in which the blade or bowl automatically maintains a level position between the front and rear ground-engaging wheels, regardless of uneven terrain and the like. A particular feature of this invention is the provision of an articulated frame arrangement in which center wheels support the middle portion of the frame, whereby when passing over uneven ground, the central portion of the frame rises and falls with changes in the ground surface, with a vertically adjustable blade or bowl so connected with the frame that the blade or bowl is held on a level course so that it cuts off the humps and fills in the low spots automatically without requiring the operator to operate any raising and lowering means.

A further feature of this invention is the provision of frame means including a rear bogie that is adapted to swing laterally relative to the main frame, as when making a sharp turn, with means responsive to lateral swinging of the rear bogie relative to the main frame for controlling the blade position. Specifically, according to this invention, means is provided for automatically locking the blade against downward movement whenever the outfit turns and the rear bogie swings laterally relative to the main frame section, thus preventing digging by either end of the blade. When the turn is completed, the blade-locking latch disengages and the automatic blade-leveling linkage again becomes operative.

A further feature of this invention is the provision of means providing for ready arrangement of the land leveler for highway travel at acceptable transport speeds. Specifically, means is provided for locking the gauging beam to the associated main frame part, whereby the center wheels and blade are held against movement relative to the frame and, in addition, means is provided for easily and conveniently disconnecting the rear bogie from the gauging beam, whereby in transport the bogie is in a float position and can swing up and down relative to the land leveler to accommodate passage over uneven ground. Means is also provided for placing the center wheels in a narrowed position to reduce the transport width and improve the division of weight between the several wheels of the leveler.

These and other objects and advantages of this invention will be apparent to those skilled in the art after a consideration of the following detailed description, taken in conjunction with the accompanying drawings, in which:

FIGS. 1 and 1a form a perspective view of a plane or land leveler in which the principles of this invention have been incorporated, the leveler being shown in operating position in these figures.

FIGS. 2 and 2a are fragmentary side views, with parts in section, showing the details of the hinged connection between the rear bogie and the rear portion of the center frame section and also certain details of the gauging beam that normally is fixed to the rear bogie.

FIG. 3 is a fragmentary side view showing the blade or bowl controlling linkage when operating over level ground.

FIG. 4 is a view similar to FIG. 3, showing the blade and linkage parts when operating over uneven ground.

FIG. 5 is a fragmentary perspective view showing the center wheels disposed in a position behind the blade or bowl.

FIG. 6 is a fragmentary perspective view of the rear portion of the land plane or leveler, showing the rear bogie in the position it occupies when making a sharp turn.

FIG. 7 is a fragmentary side view showing the bowl leveling means.

Referring first to FIGS. 1 and 1a, the land plane or land leveler of this invention comprises main frame means 10 extending generally longitudinally and including a tongue section 11 and a central frame section 12, the adjacent ends of which carry vertical angles 14 and 13, respectively, and upper and lower cooperating flanges 15 and 16, respectively, these parts being apertured to receive connecting bolts 17 whereby the two frame sections are rigidly connected together.

The rear section 19 of the implement frame comprises a rear bogie made up of a pair of forwardly converging right- and left-hand channel members 22 and 21, respectively, connected together at the forward end by an attaching member in the form of a U-shaped gusset member 23 having upper and lower parts 24 secured, as by bolts 25, to flanges of the channel members 21 and 22. The forward end of the rear bogie 19 is normally connected to the rear portion of the center frame section 12 by articulated hinge means indicated in its entirety by the reference numeral 26. As will best be seen in FIG. 2a the forward end of the bogie frame is secured, as by bolts 27, to a gudgeon bracket 28 having upper and lower forwardly extending ends 31 and 32 that are apertured to receive a gudgeon pin 33 that extends through the ends 31 and 32 and through a vertical sleeve 35 that forms the rear portion of a gauging beam 36 that is disposed within and extends forwardly relative to the rear portion of the center frame section 12, the latter being in the form of a hollow beam. Thus, the hinge means 26, connecting the gauging beam with the bogie frame, provides for lateral swinging of the bogie frame 19 relative to the gauging beam 36 and to the center frame section 12, but the gauging beam 36 is rigid in a vertical direction relative to the bogie frame 19. However, the gauging beam is apertured to receive a transverse sleeve 37, and a horizontal or transverse pivot pin 38 extends through the openings in the rear end of the center frame section 12 and through the sleeve whereby the bogie frame 19 and the gauging beam 36 pivot in a generally vertical plane relative to the center frame section 12 on the pin 38. Normally, the gauging beam 36 may swing vertically within the main frame section 12, but swinging movement may be prevented by inserting a locking pin 39 through openings 41 in the side of the frame section 12 and an opening 42 in the gauging beam 36.

As shown in FIG. 1a, the bogie frame channels 21 and 22 extend divergently rearwardly, being reinforced by a crossbar 46 fixed to the lower flanges of channels 21 and 22 intermediate their ends. The rear ends of the channels taper in a vertical direction and are fixed to plate brackets 47 that are apertured to receive a transversely disposed rear axle 48, to which the brackets 47 are welded. The brackets are preferably bolted, as at 49, to the rear ends of the bogie frame channels 21 and 22. Ground wheels 51 are journaled on the outer ends of the axle 48. Fixed to each end of the axle 48, laterally outwardly of the associated bracket 47, is a rearwardly extending bracket 53, the latter and the associated bracket 47 being apertured to receive a pivot pin 54 on which an associated link bar 55 is mounted. The two link bars 55 are provided at their rear ends with pairs of apertures to receive bolts 57 that adjustably connect a transverse smoother channel 61 to the bars 55, the channel 61 being provided with a pair of angle brackets 62 apertured to receive the bolts 57. The vertical flange of each angle bracket 62 is apertured and slotted, as at 63, to provide for connecting the smoother channel 61 in different positions relative to the link bars 55. Bolts 64 removably connect the angle brackets 62 to the inwardly extending flanges 65 at the upper portion of the smoother channel 61. Slotted openings 66 are formed in the rear ends of the brackets 53 to receive U-bolts 67 that fix the link bars 55 to the brackets 53 in different positions of adjustment. If the U-bolts 67 are removed the smoother will float, in which case the U-bolts 67 may be carried in openings in angle bracket 62. By loosening the front bolts 57 the smoother channel 61 may be shifted to give the same the proper tilt to do the best work. The U-bolts 67 carry nuts 68.

In most soil conditions the smoother 61 should be fastened to the bars 55 so that the front of the smoother is tilted slightly upwardly. When dry soil conditions are encountered the tilt should be reduced, allowing the smoother to drag soil to fill the tracks made by the wheels 51. The smoother 61 is reversible and can be turned end-for-end to provide longer wear after the leading edge is worn. By removing the U-bolts 67, the smoother may be lifted upwardly and swung about pivot pins 54 over onto the rear portions of the bogie channels 21 and 22 for transport. When it is not desired to permit the bogie and its gauging beam to swing generally vertically about the axis as defined by the pin 38, the locking pin 39 may be disposed in the openings 41 in the side of the center beam section 12 and through the opening 42 (FIG. 4) in the gauging beam 36. This holds the gauging beam 36 against swinging generally vertically within the center frame section 12. This will be referred to below in detail. Ordinarily, the gauging beam is permitted to swing within the center section 12.

The center frame section 12 carries a blade frame 80 that is made up of a pair of transverse generally inverted V-shaped front and rear frame members 81 and 82, such as square tubes. Each has a central saddle section 84 including a horizontal attaching plate 85 that is apertured to receive bolts 86 that connect the flat or platform portions of the saddle section 84 with horizontal bracket plates 88 fixed, as by welding or the like, to the lower face of the main frame center section 12. The blade frame 80 is reenforced by diagonal brace bars 89. The blade frame 80 also includes fore-and-aft extending end bars 91 that are bolted to the end plates 92 carried by the front and rear frame members 81 and 82. Thus, the latter members, together with the fore-and-aft extending end bars 91 and associated parts, and the braces 89, form a rigid transversely disposed blade frame 80 that is fixed to the center frame section 12.

The blade or bowl unit of the land leveler constructed according to the principles just mentioned is indicated by the reference numeral 100 and includes a transversely disposed arcuate blade section 101 having a replaceable cutting edge portion 102 and side plates 103 secured, as by welding, to the ends of the arcuate blade 101. The latter, with the side plates 103, form a soil-holding bowl. The blade unit 100 is closed at the rear by a vertical plate section 104 and is mounted within the blade frame 82 for generally vertical swinging movement about a generally transverse axis. To this end, each of the side plate members 103 carries a draft arm 105 that is adjustably bolted to the inner face of the associated end plate 103, extending forwardly therefrom and apertured to receive a pivot bolt 112 that extends through an aperture in the associated end piece 92, the two pivot bolts 112 forming a transverse axis about which the blade unit 100 may be raised and lowered.

According to this invention, we provide ground-engaging wheel units 117 attached to opposite ends of the blade frame 80 whereby the wheels 118 are disposed in laterally spaced apart relation at opposite sides of the main frame center section 12. The ground-engaging wheel units are disposable on the blade frame in two optional positions, one in which each ground wheel 118 is disposed generally at the ends of the blade frame (FIGS. 1 and 6), the other position being with the ground wheels 118 in rear of the bowl or blade unit 100 and laterally inwardly of the planes of the ends of said unit (FIG. 5). The latter position is one in which the center ground wheels 118 preferably are disposed when land leveling along tree rows, fences or borders. As will best be seen from FIG. 1, each ground wheel 118 is mounted on an axle arm 121 to one end of which is fixed a stub axle 122. Each arm 121 is provided with a pair of openings (not shown) to receive bolts 124 that fix the arm to the associated blade frame bar 91 in the position shown in FIG. 1 or, optionally, in the position shown in FIG. 5. It will be noted that in FIG. 5 the supporting wheels 118 for the center frame section 12 are disposed behind the blade or bowl and laterally inwardly of the associated supporting bars 121. This places the wheels 118 in their narrow position.

The front end of the tongue section 11 of the main frame means is preferably carried on a dolly 130 at the mid-point thereof that automatically reduces by 50% the movement of the front end of the leveler in comparison with the tractor drawbar as the tractor moves over irregular ground. The dolly 130 includes a fore-and-aft extending frame 131 that includes channels 132 welded at their rear ends in spaced apart relation to a rear cross bar 134 to the rear ends of which spindle sleeves 135 are fixed. Caster wheel axles 136 are journaled in the sleeves 135 and carry full castering wheels 137. A hitch lug 138 at the front end of the dolly frame 131 is apertured to receive hitch means connecting the dolly to the propelling tractor, the dolly frame thus being carried at its front end on the tractor drawbar and at its rear end on the full castering wheels 137. An apertured lug 141 is carried by the dolly frame and receives hitch pin means 142 by which an adjustable tongue member 143 is connected to the dolly frame. The tongue member 143 is pivoted at 145 to the front end of the frame section 11 and is adjusted generally vertically relative to the frame member 11 by means of a screw threaded member 146 carrying a pivoted handle 147.

Secured to the rear ends of the dolly frame side channels 132 and the cross bar 134 are upstanding side bars 148 braced at 149 and acting to maintain fore-and-aft alignment between the dolly and the front frame section 11 at all times, especially on turns. The tongue section 11 carries wear plates 150 which the side bars rub against.

By virtue of the means just described, and particularly the full 360° swiveling caster wheels 137, short tight turns may be made at row ends and in corners, and there is no tendency for the wheels to dig into the ground on turns. Further, since the dolly frame is held by the side bars 148 against turning in a horizontal plane, there is no collapsing of the dolly-implement frame connection when backing or making sudden stops during transport.

One particularly important feature of this invention is the provision of mechanism to automatically maintain the blade or bowl in a level position regardless of the terrain and movement of the wheels. This mechanism will now be described.

As best shown in FIG. 3, the forward end of the gauging beam 36 lies within the main frame section 12 and carries a pair of end plates 151 apertured to receive a pivot 152 by which the upper end of a generally vertical link 153 is connected thereto. The lower end of the link 153 is connected to a pair of lugs 154 (FIG. 6) by a pivot pin 155. The lugs 154 are carried by a yoke forming an equalizing member 158 (FIG. 5) having a pair of rearwardly extending arms 159 (FIG. 1) interconnected by a sleeve 160 carrying the lugs 154. The ends of the arms 159 are connected by vertical links 161 to lugs 162 by pivot pins 163, the lugs 162 being fixed, as by welding, to the back plate 104 of the blade or bowl unit 100.

A bell crank 166 is mounted for rocking movement on the main frame section. The bell crank 166 is made up of a pair of triangular sections 167 disposed in spaced apart relation on opposite sides of the frame section 12 and rigidly interconnected by cross sleeves 169 and 171. The bell crank 166 is mounted for rocking movement on the frame section 12 by a cross shaft 172 carried in a pair of brackets 173 fixed to the lower portion of the frame section 12. Bushings 175 fixed to the bell crank sections 167 receive the shaft 172. A power cylinder 180 is pivotally anchored at one end to a frame-carried bracket 181, and the piston end of the unit 180 is pivoted, as at 182, to a lug 183 carried by the cross sleeve 171. Extension and retraction of the power unit 180 serves to rock the bell crank 166 so as to raise and lower the sleeve section 169 on which the yoke 158 is pivotally mounted. When the cylinder unit 180 is hydraulically locked against movement, the equalizer 158 is rockable about an axle that is fixed relative to the frame 12. Hydraulic fluid lines 185 communicate with the unit 180 in the usual manner and are connected with a source of hydraulic power on the tractor.

Referring now to FIGS. 3 and 4, assume that the rear end of the tractor at this time is passing over level ground so that the front end of the dolly frame, indicated at 138 (FIG. 1), does not rise or fall, the bowl linkage parts will be in the positions shown in FIG. 3 and the cutting edge of the blade and the sensing wheels 118 will be at the same level as the rear bogie wheels 51 and the dolly wheels 137. If there should be a hump or rise in the path of travel of the implement, passage of the tractor wheels and the dolly wheels thereover will have only a small effect on the blade or bowl, and when the sensing wheels 118 encounter the hump or ridge they will raise the rear end of the center frame section 12, the rear end thereof pivoting relative to the rear bogie 19 about the pin 38, as indicated in FIG. 4. This occasions angular movement of the gauging beam 36 within the main frame center beam 12. Specifically, when the rear end of the main center beam or frame section 12 is raised, while the rear bogie wheels 51 remain on level ground, the forward end 151 of the gauging beam 36 is raised relative to the center frame section 12. This upward movement is transmitted through the generally vertical links 153 to the forward portion of the equalizing member 158, which is fulcrumed on the pin 176 carried by the bell crank 166. Thus, the rear arms 159 of the evener member 158 move downwardly relative to the main frame section 12 and thus lowers the bowl or blade 100 about its pivot axis as defined by the pins 112. The parts are so arranged, according to this invention, that the bowl or blade is lowered substantially the same amount, relative to a horizontal plane passing through the rear bogie wheels and on the front castering wheels 137, as the rear end of the center frame section 12 is raised. This keeps the blade or bowl operating in a level position, thus scraping off the ridge or hump and leveling the land. Substantially the reverse of these movements occurs if the blade frame wheels 118 should drop into a low spot, the blade or bowl then being automatically raised and thus depositing soil to fill up the low spot.

It is to be noted from FIG. 1 that the wheels 118 are journaled for rotation on stub shafts that are fixedly connected to the outer or side portions 91 of the blade frame 80. Thus, these widely spaced apart wheels serve to hold the leveler in proper position, stabilizing the same against tilting laterally in one direction or the other. The blade or bowl 100 moves vertically independently of the wheels 118, being controlled substantially entirely by the angular movement of the rear bogie 19 relative to the central frame section 12, as described immediately above.

It will be recalled that the rear bogie 19 is capable of swinging laterally relative to the rear portion of the center frame section 12 about the pivot pin 33 (FIG. 2a). However, when the rear bogie swings to one side some of the automatic leveling action is lost because of the angular position of the bogie frame 19. That is, the latter is no longer in longitudinal alignment with the center section 12 and does not, therefore, contribute very much if any effective supporting effect. As a result there may be some tendency for the end of the bowl or blade to dig into the ground when making a fairly sharp turn, especially if the center wheels 118 should at this time pass over an obstruction or the like, which automatically lowers the bowl frame.

According to this invention, we provide latch means that, in response to turning of the bogie frame 19 laterally relative to the center frame section 12, serves to automatically lock the blade or bowl against lowering relative to the center section 12. This latch means and the control therefor will now be described.

Referring first to FIG. 2, a latch arm 190 is pivoted for fore-and-aft swinging in a generally vertical plane to an apertured lug 191 fixed to the forward side of the rear member 82 of the transverse blade frame. The lower end of the latch arm 190 carries a detent 192 that is adapted to engage in a rack 193 fixed to the rear side of the blade unit 100. The rack 193 is of sufficient vertical extent so that the detent 192 may engage any one of several slots in the rack 193 when the latch arm 190 is urged forwardly or to the right as viewed in FIG. 2. Means to this end includes a spring 196 (FIG. 2) anchored at its forward end to a fixed point on the lower side of the main frame center section 12 and connected at its rear end to a pin 197 carried by the arm 190. Unrestrained, the spring 196 serves to swing the latch arm forwardly and to engage and lock against the blade rack 193 so as to hold the blade unit against downward movement. Normally, however, when the rear bogie 19 is disposed in a fore-and-aft aligned position relative to the center frame section 12, a chain 198, connected between the pin 197 on the latch arm 190 and an anchoring member 201 on the lower part of the center frame section, serves to shift the latch arm 190 rearwardly and hold the same in that position, with the detent 192 held out of contact with the rack member 193, as shown in FIG. 2. Thus, as long as the rear bogie 19 is in a rear straight line position with the land leveler frame, the latch arm 190 is held against engaging the blade and hence the blade is under the control of the gauging beam 36 and associated linkage, as described above.

Thus, whenever a sharp turn is made (FIG. 6), the blade or bowl is automatically locked against vertical displacement relative to the frame section 12, the chain 198 going slack and permitting the spring 196 to pull the arm 190 into bowl-locking position.

For leveling the blade or bowl 100 within the bowl frame 80, the following structure is provided. Referring to FIG. 7, each bowl draft arm 105 referred to above is pivotally connected at its rear end with the associated bowl side plate 103 by a pivot bolt 201. Forwardly thereof each arm 105 is provided with a pair of openings in which bolts 202, extending through slots 203 in the bowl side plate 103, are received. The forward end of each draft arm 105 is apertured to receive the associated pivot member 112. Fixed to the upper forward portion of each bowl side plate 103 is an apertured and tapped lug 205 located just above the adjacent edge portion of the associated bowl draft arm 105. Disposed in each lug 205 is a bowl-adjusting bolt 206 carrying a lock nut 207.

By loosening the bolts 202 and the lock nut 207, the associated adjusting bolt 206 may be given a few turns to raise or lower the bowl end relative to the arm 105, and after the desired adjustment has been made the bolts 202 and lock nut 207 are tightened.

According to our invention, we provide means for exerting a substantially constant down pressure on the cutting blade or bowl 100 regardless of the terrain over which the dolly 130, center wheels 118 and rear bogie wheels 51 pass. Mechanism for this purpose includes a pivot arm 215 (FIGS. 3 and 4) pivotally connected at 155 with the lugs 154 and extending forwardly and upwardly, and a swingably mounted link 217 pivoted at 218 to the arm 215 and at 219 to a bracket 221 on the main frame section 12. A spring 223 is connected between the upper forward end of the arm 215 and an adjusting bolt 224. The bolt 224 is adjusted so as to impart considerable tension to the spring 223, sufficient to exert an appreciable downward force through the evener yoke 158 and link 161 to the blade or bowl unit 100.

As will be seen from FIGS. 3 and 4, as the wheels 117 pass over humps or ridges, or through swales or other low places, the yoke 158 rotates or rocks about the axis defined by the pivots 176, this point remaining fixed since the power unit 180 is normally locked against extension or retraction. Rocking of the member 158 causes changes in the relative positions of the spring pivot arm 215 and the spring pivot link 217, with consequent changes in the effective length of the spring 223, but the various pivots are so located that the resultant force applied to the member 158, and through the latter to the blade or bowl, remains relatively constant over a considerable range of movement of the blade above and below the level position shown in FIG. 3.

The land leveler of this invention may readily be arranged for highway transport by inserting the pin 39 (FIG. 6) through the openings 41 and 42 (FIG. 4) after the rear bogie 19 has been loosened by removing the bolts 27 (FIG. 2a) and the openings brought into alignment. This permits the bogie 19 to shift rearwardly along a short bar 231 carried by the part 28 until the part 23 strikes a stop member 230, preferably in the form of a horizontal bolt, carried by the lug 231. In this position of the parts, the bogie is freed from the gauging beam 36, except that it is connected therewith in trailing relation by the horizontal bolt 230. The bogie then becomes a cart-type trailer with a single hitch point and passage of the implement, not only along roads and highways but also across ground irregularities is facilitated.

If desired, the bogie 19 may be completely disconnected from the rest of the land leveler by removing the bolt 230, and when the bogie is so removed, the machine becomes a farm scraper having a connection at its forward portion with the propelling tractor and a blade supported on ground wheels at the rear portion thereof.

While we have shown and described above the preferred structure in which the principles of the present invention have been incorporated, it is to be understood that our invention is not to be limited to the particular details, shown and described above, but, in fact, widely different means may be employed in the practice of the broader aspects of our invention.

What we claim, therefore, and desire to secure by Letters Patents is:

1. A land leveler comprising a generally fore-and-aft extending main frame means, a first ground engaging support means carrying the front end of said main frame means, a second ground engaging support means carrying the rear end of said main frame means, a rear bogie hingedly connected at its front end to the rear end of said main frame means for generally vertical swinging movement relative thereto, a transverse blade, means connecting said blade to said frame means for generally vertical movement relative to said frame means, a bell crank swingably carried by said main frame means and including a generally horizontally disposed arm and a generally vertical arm, a lever pivoted at an intermediate point on the outer end of said horizontally disposed bell crank arm, means connecting one end of the lever with said blade, means connecting the other end of said lever with said rear bogie at a point spaced from the axis of swinging movement of the bogie relative to the main frame means, and a power unit connected with said vertical arm to swing said bell crank.

2. A land leveler comprising: a generally fore-and-aft extending main frame means, a first ground engaging means supporting the forward end of said frame means, a second ground engaging means supporting the rear end of said main frame means, a transverse blade connected to the rear portion of said main frame means for generally vertical movement relative thereto, a rear bogie hingedly connected at its forward end to the rear end of said main frame means for generally vertical swinging movement relative thereto and for lateral swinging relative to the rear end of said main frame means about a vertical axis, lever means connected with said rear bogie and the blade and responsive to vertical swinging movement of the rear bogie relative to the main frame means for shifting said blade generally vertically, and means locking said blade to said main frame means in response to movement of said rear bogie about said vertical axis.

3. A land leveler comprising: a generally fore-and-aft extending main frame means, a rear member movably connected at its front portion with the rear end of said main frame means for lateral movement relative thereto, a transverse blade carried for generally vertical movement relative to the main frame means, and means connected with said rear frame member and operated by lateral movement of said rear member relative to said main frame means for locking said blade against movement relative to said main frame means.

4. A land leveler comprising: a generally fore-and-aft extending main frame means, a rear member movably connected at its front portion with the rear end of said main frame means for movement relative thereto about a generally vertical axis between a position in which said rear member extends rearwardly in generally longitudinal alignment with said main frame means to a position extending laterally relative to the longitudinal axis of said main frame means, a transverse blade carried for generally vertical movement relative to the main frame means, and means connected with said rear frame member and operated by movement of said rear member into a laterally extending position relative to said main frame means for locking said blade against movement relative to said main frame means said locking means including an arm pivoted to the main frame means and having lock means adapted to interlock with said blade when the rear member swings laterally.

5. The invention set forth in claim 4, further characterized by spring means connected with said arm and said main frame means for urging the lower end of said arm against said blade, interengaging means on the blade and the lower end of said arm, and a flexible connection between said arm and said rear member whereby said flexible member pulls said arm away from the blade when said rear member swings back into aligned position relative to said main frame means.

6. In a land leveler, main frame means, a blade connected therewith for generally vertical movement relative thereto, a part swingable laterally relative to said main frame means, a latch arm pivoted to said main frame means, spring means connected with said latch arm and biasing the latter to engage and lock the blade to said frame means, and a connection between the latch arm and said swingable part whereby when the latter is in a given position relative to said frame means, said connection holds said latch arm disconnected from said blade.

7. A land leveler comprising: generally fore-and-aft extending main frame means, a rear bogie section connected at its forward end to the rear end of said main frame means for lateral movement relative thereto, a blade connected with said main frame means for generally vertical movement relative thereto, means to releasably lock said blade to said main frame means, and means connected with said rear bogie section for controlling said blade-locking means, said means including a part connected with said rear bogie and movable in response to lateral shifting of said rear bogie relative to said main frame means, and means connected with said movable part and shiftable into and out of locking connection with said blade.

8. A land leveler comprising: generally fore-and-aft extending main frame means, a rear bogie section connected at its forward end to the rear end of said main frame means for vertical movement relative thereto, a blade connected with said main frame means for generally vertical movement relative thereto, means connected with said rear bogie section and said blade for controlling the position of the latter in response to vertical movement of the rear bogie section, means releasably connecting said bogie section with said main frame and means locking said blade to said frame means when said bogie is disconnected from said main frame.

9. A land leveler comprising: generally fore-and-aft extending main frame means, a rear bogie section, means releasably connecting said bogie section with said main frame for generally vertical movement relative thereto, a blade connected with said main frame means for generally vertical movement relative thereto, means connecting said blade with said bogie section whereby generally vertical movement of the bogie section relative to the frame means controls the position of said blade, and means to lock the blade in a fixed vertical position relative to said frame means when the bogie section is disconnected from said frame means.

10. A land leveler comprising a generally fore-and-aft extending main frame means, and means for connecting the front end of the main frame means with a propelling tractor, comprising a front dolly having a generally horizontal fore-and-aft extending frame, means on the fore portion of the dolly frame to supportingly connect the forward portion of the dolly frame with a propelling tractor, means on the dolly and disposed substantially midway between the fore and aft ends of the dolly to pivotally receive the forward portion of said main frame means for generally up and down swinging relative thereto, and ground-engaging wheel means of the full swivel type supporting the rear end of the dolly frame.

11. A land leveler as defined in claim 10, further characterized by adjustable means connecting the forward end of said main frame means with the dolly frame in different vertical positions relative to the latter.

References Cited in the file of this patent
UNITED STATES PATENTS

| | | |
|---|---|---|
| 2,257,596 | Davenport | Sept. 30, 1941 |
| 2,278,006 | Waltke | Mar. 31, 1942 |
| 2,444,977 | Clark | July 13, 1948 |
| 2,722,067 | Baron | Nov. 1, 1955 |
| 2,779,113 | McKay | Jan. 29, 1957 |
| 2,792,651 | Hobday | May 21, 1957 |
| 2,842,874 | Shumaker et al. | July 15, 1958 |
| 2,844,389 | Burnett | July 22, 1958 |
| 2,893,140 | Gurries | July 7, 1959 |